(12) United States Patent
Stephens, Jr.

(10) Patent No.: US 9,823,070 B2
(45) Date of Patent: Nov. 21, 2017

(54) REMOTE RECONNAISSANCE FOR SPACE EXPLORATION

(71) Applicant: Kenneth Dean Stephens, Jr., San Ramon, CA (US)

(72) Inventor: Kenneth Dean Stephens, Jr., San Ramon, CA (US)

( * ) Notice: Subject to any disclaimer, the term of this patent is extended or adjusted under 35 U.S.C. 154(b) by 268 days.

(21) Appl. No.: 14/594,128

(22) Filed: Jan. 11, 2015

(65) Prior Publication Data
US 2016/0205356 A1    Jul. 14, 2016

(51) Int. Cl.
*G01C 11/00*    (2006.01)
*H04N 5/232*    (2006.01)
*H04N 5/247*    (2006.01)
*H04N 7/18*     (2006.01)
*B64G 1/10*     (2006.01)

(52) U.S. Cl.
CPC ......... *G01C 11/00* (2013.01); *H04N 5/23203* (2013.01); *H04N 5/247* (2013.01); *B64C 2201/127* (2013.01); *B64G 2001/1035* (2013.01); *B64G 2700/00* (2013.01); *H04N 7/183* (2013.01)

(58) Field of Classification Search
CPC ........ B64G 2700/00; B64G 2001/1035; G01C 11/00; B64C 2201/127; B64C 39/00
USPC .......................... 701/13; 700/259; 244/173.3
See application file for complete search history.

(56) References Cited

U.S. PATENT DOCUMENTS

| | | | | |
|---|---|---|---|---|
| 5,186,418 A * | 2/1993 | Lauritsen | ................. | B64D 1/00 102/387 |
| 6,380,889 B1 * | 4/2002 | Herrmann | ................. | F41G 3/02 340/870.1 |
| 6,869,048 B2 * | 3/2005 | Draisey | ................. | B64G 1/242 244/158.1 |
| 7,162,199 B1 * | 1/2007 | Glickstein | ............ | G06Q 20/382 370/259 |
| 7,341,224 B1 * | 3/2008 | Osann, Jr. | ............. | B64C 39/028 244/30 |
| 8,159,357 B1 * | 4/2012 | Jarvinen | ................. | G01V 9/02 244/134 R |
| 8,590,777 B1 * | 11/2013 | Roman | ................. | G06Q 10/08 235/375 |
| 8,682,522 B2 * | 3/2014 | Palmer | ................. | G06T 1/0014 701/1 |
| 8,718,822 B1 * | 5/2014 | Hickman | ............... | B25J 9/1674 700/214 |
| 8,744,126 B1 * | 6/2014 | Rohrschneider | ..... | G06K 9/0063 382/100 |

(Continued)

OTHER PUBLICATIONS

Hsu (The Future of Space Robots, Jul. 2, 2008, 1 page, http://www.space.com/5584-future-space-robots.html retrieved from the internet archive way back machine https://web-beta.archive.org/web/20120315190054/http://www.space.com/5584-future-space-robots.html).*

*Primary Examiner* — Ruth Ilan

(57) ABSTRACT

A system of reconnaissance for the staging of a mission in a target area of a remote location in space is disclosed, including satellite surveillance means; a plurality of radio beacon/video camera transceiver means; communication means connecting the satellite surveillance means with the plurality of radio beacon/video camera transceiver means; communication means connecting the plurality of radio beacon/video camera transceiver means with at least one base station; and analysis means to analyze video, positional and other data from the target area.

18 Claims, 6 Drawing Sheets

"Cluster Bomb" Reconnaisance

Overhead View After "Bombing"

(56) References Cited

U.S. PATENT DOCUMENTS

| | | | |
|---|---|---|---|
| 8,939,056 B1* | 1/2015 | Neal, III | F42B 15/22 102/387 |
| 9,234,728 B2* | 1/2016 | Akcasu | F42B 10/56 |
| 2004/0066451 A1* | 4/2004 | Schroth | F42B 12/365 348/144 |
| 2004/0162638 A1* | 8/2004 | Solomon | G05D 1/0088 700/247 |
| 2004/0196367 A1* | 10/2004 | Raymond | F42B 12/365 348/144 |
| 2005/0051667 A1* | 3/2005 | Arlton | B64C 27/10 244/17.11 |
| 2005/0239457 A1* | 10/2005 | Levin | H04B 7/18508 455/431 |
| 2006/0005733 A1* | 1/2006 | Rastegar | F42B 12/365 102/513 |
| 2006/0229801 A1* | 10/2006 | Fink | G05D 1/0246 701/117 |
| 2006/0251115 A1* | 11/2006 | Haque | H04B 7/2606 370/466 |
| 2006/0283345 A1* | 12/2006 | Feldman | F42B 12/365 102/430 |
| 2007/0260570 A1* | 11/2007 | Hinchey | G08B 17/10 706/47 |
| 2007/0266884 A1* | 11/2007 | Finneral | F41G 7/226 102/489 |
| 2011/0171986 A1* | 7/2011 | Levin | H04B 7/0837 455/509 |
| 2013/0080360 A1* | 3/2013 | Sterritt | G05B 13/02 706/14 |
| 2013/0132317 A1* | 5/2013 | Hinchey | G06N 5/02 706/46 |
| 2013/0282174 A1* | 10/2013 | Xi | B25J 9/1682 700/248 |
| 2015/0346722 A1* | 12/2015 | Herz | G05D 1/0038 701/2 |
| 2017/0088205 A1* | 3/2017 | Karras | B64C 27/08 |

* cited by examiner

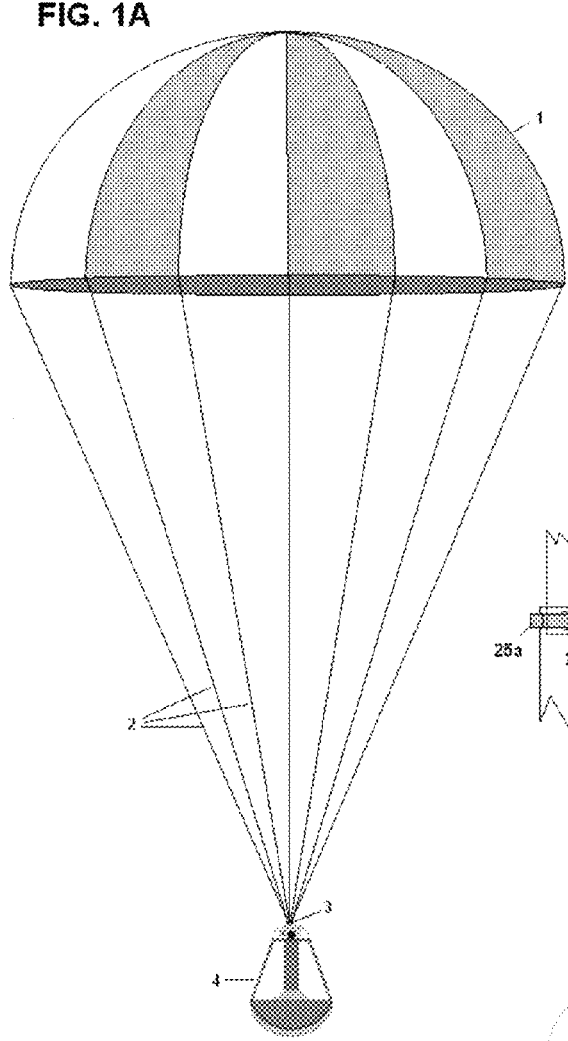
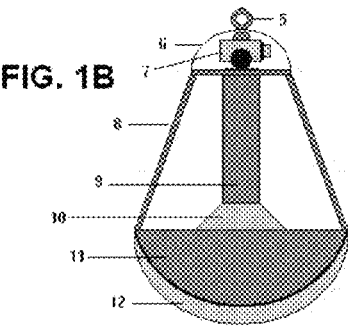
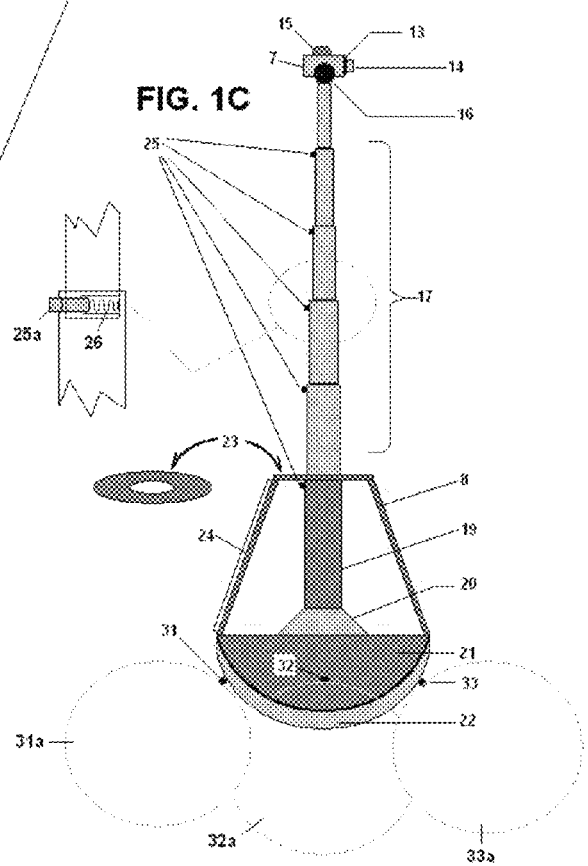
FIG. 1A
FIG. 1B
FIG. 1C

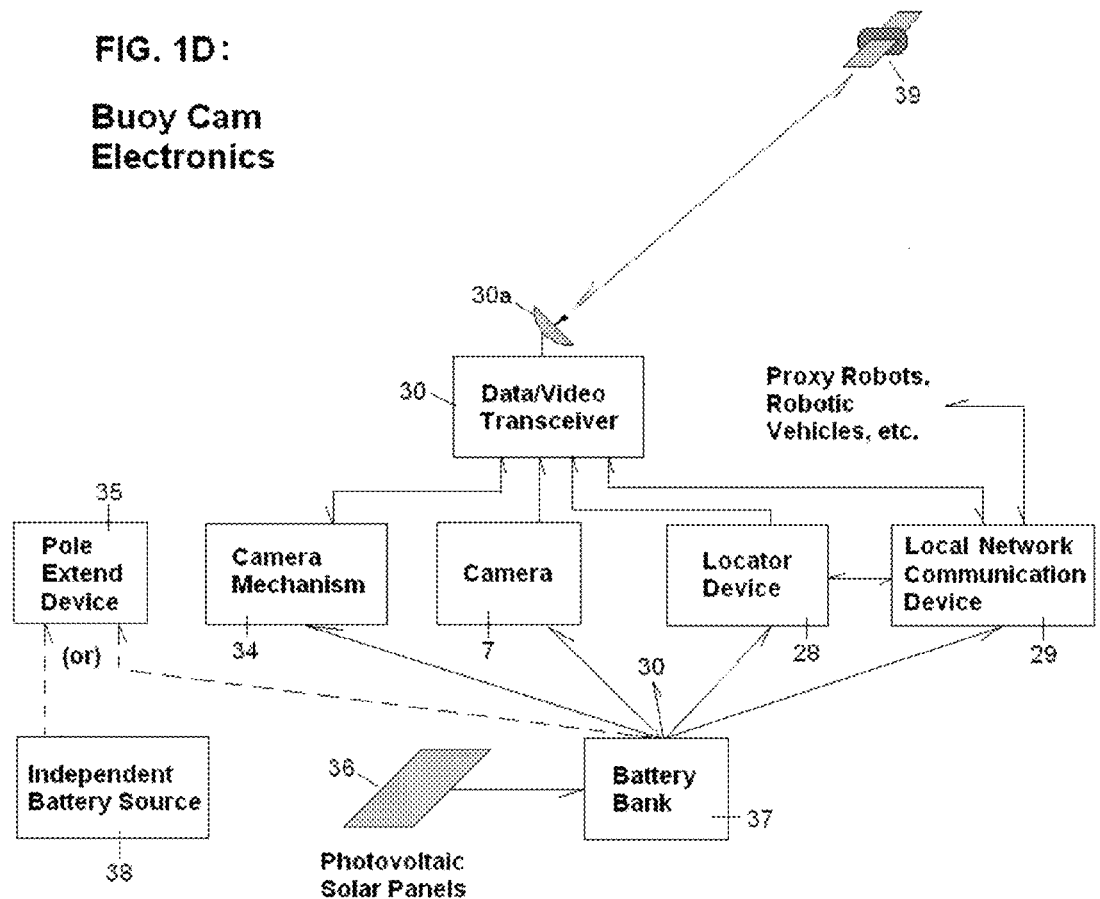

"Cluster Bomb" Reconnaisance

FIG. 4B: Overhead View After "Bombing"

FIG. 4C: Best Initial Network Area

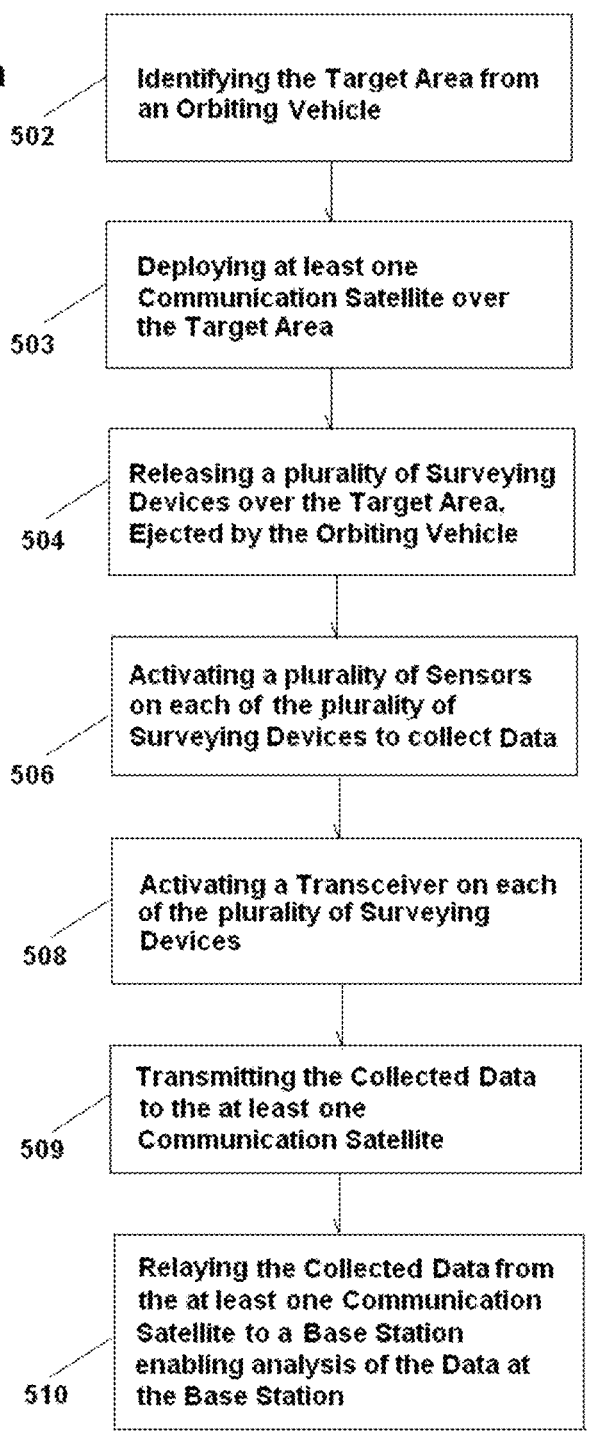
FIG. 5: Flow Diagram

REMOTE RECONNAISSANCE FOR SPACE EXPLORATION

CLAIM OF PRIORITY

The present invention claims priority to non-provisional U.S. Patent Application No. 61/926,956 filed on Jan. 14, 2014 entitled "Remote Reconnaissance For Space Exploration".

FIELD OF THE INVENTION

The present claimed invention generally relates to robotic space exploration. More specifically the present invention relates to systems and apparatus for the reconnaissance of remote environments in space.

BACKGROUND OF THE INVENTION

This specification is about human telepresence in space. During his or her turn in control of a given proxy robot, the human handler sees and feels and acts through the "person" of that robot: guiding the proxy in exploring; mining; doing science experiments; constructing; observing the stars, earth or other planets; or even launching spaceships to further destinations. To maximize this interface, the human handler should have access to an environment simulator that replicates the conditions of the proxy robot's remote location to the greatest possible extent; for this to happen, precise video, locational and other data must stream continually from the remote mission site.

There are a number of patents in the prior art dealing with local positioning systems: Schipper U.S. Pat. No. 5,983,159 anticipates planetary use in "Location determination using signals from fewer than four satellites"; Issler, et al U.S. Pat. No. 5,995,040 describe "a set of wide spectrum beacons" which form networks to provide radionavigation and radiopositioning information in "Global space radiopositioning and radionavigation system, beacon and receiver used in this system"; and Mathews, et al U.S. Pat. No. 7,916,074 include RFID tag readers in "System and method for positioning in configured environments." The invention described herein builds on this and other prior art in describing apparatus and systems for implementing the collection and bundling of mission site video, locational data and communications means in such manner as to provide precise and timely information to the human controllers of proxy robots and robotic vehicles and maximize mission efficiency by permitting the remote operation to proceed in approximated real time (co-pending Stephens Ser. No. 13/970,910).

Stephens '910 describes how video cameras, radio beacons and transponders on the ground at some distant mission site can be used to either illuminate and refine existing photos and GPS readings pertinent to that locality or provide an alternative, local GPS-style reference system in the absence of adequate photos and GPS readings. The application below is concerned with novel devices combining radio-location means, video camera means and communication means, and the distribution and effective use of such devices, particularly in networks.

While a major focus of the present invention is the provision of remote reconnaissance for robotic space exploration—including proxy robotics, robotic vehicles and robots in general—it is important to note that the same reconnaissance apparatus, techniques and methodologies can also be used for both the study from Earth of a distant planet like Mars and to prepare for the day when humans travel to explore the planet.

Objects of the Invention

One object of the present invention is to describe a viable methodology for human space exploration utilizing proxy robot surrogates in space controlled by humans in environment simulators on earth or elsewhere.

A second object of the present invention is to provide human telepresence on the Mars and other locations near earth utilizing proxy robots capable of being controlled by one or more human handlers in real or approximated real time.

A third object of the present invention is to achieve human telepresence on Mars and other locations in space utilizing proxy robot surrogates for humans in simulated environments back on earth or at some other location.

A fourth object of this invention is to provide a viable methodology for space exploration utilizing proxy robots, proxy robot-driven vehicles and robotic vehicles in space controlled by humans on Earth.

A fifth object of this invention is a method and apparatus for the establishment of a surveillance grid through the provision of a plurality of pole cameras which can be dropped onto a body in space from an orbiting spacecraft, satellite, or a balloon or other aircraft.

A sixth object of the present invention is a method and apparatus for the establishment of a surveillance grid through the provision of a plurality of position-marking radio beacons which can be dropped onto a body in space from an orbiting spacecraft, satellite, or a balloon or other aircraft.

A seventh object of the present invention is a method and apparatus for the establishment of a surveillance grid through the provision of a plurality of position-marking passive transponders which can be dropped onto a body in space from an orbiting spacecraft, satellite, or a balloon or other aircraft.

An eighth object of this invention is further to object seven, wherein the passive transponders constitute radio frequency identification (RFID) circuits.

A ninth object of this invention is further to objects five through eight, wherein each pole camera assembly of object five also includes one of the position-marking means described in objects six through eight.

A tenth object of this invention is for the establishment of a highly accurate positioning system through the formation of a mesh network of the position-marking means in objects six through eight and utilizing their signals or transponder responses to triangulate and define the location of any target object within the perimeter of that network.

An eleventh object of the present invention is further to object ten, wherein the target object location is defined by GPS coordinates of latitude and longitude.

A twelfth object of the present invention is further to object eleven, wherein the target object GPS location represents a further refinement of existing GPS coordinates for the area of the mesh network.

A thirteenth object of the present invention is further to object eleven, wherein the target object GPS location represents a set of local mission coordinates for the location in question.

A fourteenth object of the present invention is the provision of a "Buoy Cam" remote reconnaissance device which includes at least one video camera; camera mechanicals with at least one lens and a pan-tilt head which can be operated remotely; locator electronic means for accurately describing locational coordinates for anything within its range; local network electronic means to serve as radio node for video, communication and data interchange among Buoy Cams and other devices at the remote site; transceiver means to exchange video, communication and data between the Buoy Cam and at least one of orbiting satellites, orbiting spacecraft and travelling spacecraft; pole extending means to extend and lock a telescoping pole element; and power supply means including at least one battery and at least one photovoltaic solar panel.

A fifteenth object of the present invention is further to object fourteen, wherein a plurality of Buoy Cam video-data-communication node devices are dropped in a cluster onto a remote mission site, to operate as a surveillance and reconnaissance network.

A sixteenth object of the present invention is further to object fifteen, wherein the surveillance and reconnaissance prepares for and accompanies exploration by proxy robots, robotic vehicles and other robotic devices.

A seventeenth object of the present invention is further to object fifteen, wherein the surveillance and reconnaissance prepares for and accompanies exploration by human explorers.

An eighteenth object of the present invention is further to object fifteen, wherein the surveillance and reconnaissance facilitates detailed scientific study of a remote environment from Earth.

A nineteenth object of the present invention is further to object fourteen, wherein a single Buoy Cam is dropped onto a remote mission site to operate stand-alone as a surveillance and reconnaissance device.

SUMMARY OF THE INVENTION

A system and method of reconnaissance for the staging of a mission in a target area of a remote location in space is disclosed. The system and method includes identifying the target area from an orbiting vehicle, deploying at least one communication satellite over the target area and releasing a plurality of surveying devices over the target area ejected by the orbiting vehicle. The system and method further includes activating sensors including a video camera and a locator device on each of the plurality of surveying devices to collect video and location data and activating a transceiver on each of the plurality of surveying devices for transmitting the video and location data to a communications satellite and relaying the data from the satellite to a base station enabling analysis of the data at the base station.

Also disclosed is system of reconnaissance for the staging of a mission in a target area of a remote location in space. The system includes a surveillance means via a plurality of surveying devices released from an orbiting vehicle which identifies a target area for surveillance. The system further includes a sensor means on each of the plurality of surveying devices configured to collect data, a transceiver means on each of the plurality of surveying devices, a communication means connecting the orbiting vehicle with the plurality of surveying means and a communication means connecting the plurality of surveying means with a base station enabling transmission of video and position data of the target area.

An apparatus for remote reconnaissance is further disclosed. The apparatus includes a pole camera including at least one video camera and a camera mechanism comprising at least one lens and a pan-tilt head which can be operated remotely. The apparatus also includes a location device for determining local coordinates of the apparatus and triangulating targets within its range, a local network communication device to serve as radio node for video, communication and data interchange between the apparatus and other devices at a target area and a transceiver that exchanges video, communication and location data between the apparatus and an orbiting vehicle. Also included is a power supply including at least one battery and at least one photovoltaic solar panel.

DESCRIPTION OF THE DRAWINGS

FIG. 1A illustrates an exemplary surveying "buoy camera" (BuoyCam) device in accordance with embodiments of the invention;

FIG. 1B is an illustration of an exemplary delivery package surveying device Buoy Cam in accordance with embodiments of the invention;

FIG. 1C is an illustration of an exemplary camera 7 includes at least one lens assembly in accordance with embodiments of the invention;

FIG. 1D is an illustration of an exemplary block diagram of the electronic systems in a Buoy Cam in accordance with embodiments of the invention;

FIG. 4B is an illustration of an exemplary form of the pre-mission staging activity in accordance with embodiments of the invention;

FIG. 4C is an illustration of a best initial network area in accordance with embodiments of the invention'

FIG. 5 is an illustration of an exemplary flow diagram of a method of reconnaissance in accordance with embodiments of the invention;

DESCRIPTION OF THE INVENTION

Figure 2A:
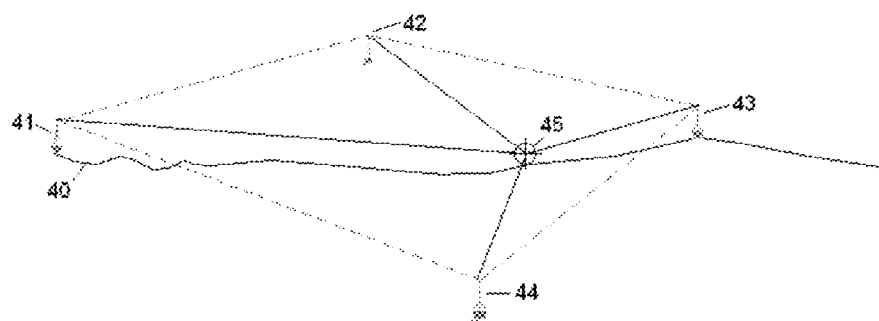
FIG. 2A is an illustration of an exemplary a small network of four surveying devices Buoy Cams in accordance with embodiments of the invention.

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

FIG. 1A illustrates a surveying "buoy camera" (BuoyCam) device 4 that can be dropped to the surface of a distant planet like Mars. In FIG. 1A, the buoy-shaped delivery package, surveying device Buoy Cam 4 is tethered to a parachute 1, whose purpose is to slow the payload's drop for a reasonably gentle touchdown. On Mars, the atmosphere is a mere $1/150^{th}$ that of Earth, while Mars' gravity is 38% of Earth's. So the parachute will need 150×0.38=57 times the area needed on Earth to have the same arresting power.

In practice, the payload could be dropped from an orbiting vehicle, with deployment of parachute 1 taking place when the bundle is near its intended target area. Parachute cords 2 are tethered to a mounting ring such as 3 in the FIG. 1A. The parachute 1 allows a controlled descent of the surveying device Buoy Cam 4 from the orbiting vehicle.

FIG. 1B depicts the delivery package surveying device Buoy Cam 4 in greater detail. Tether ring 5 is on the very top of the package, attached to a removable camera cover element 6 that can be forcefully detached from the bottom portion by remote control. This forceful ejection of the cover and ring also serves to launch the parachute away from the camera, to prevent its blocking of any viewing angle. If ejection doesn't happen correctly or is incomplete for any reason, a proxy robot could be sent to scene by a handler at mission control.

Inside of cover 6 is a high resolution camera 7, complete with lens or selectable lenses. Outer buoy housing 8 is illustrated in cut-away view. Within housing 8 is a large cylinder 9 containing a pole extension for camera 7 (see FIG. 1C below for details about camera and pole).

Section 10 houses a pole extension mechanism, while section 11 is filled with weighted material like sand, and section 12 may have portions that perform two functions. During descent, the outer skin of section 12 may serve as a heat shield, while the inner portion is a collapsible filling designed to cushion the effects of impact.

Turning to FIG. 1C, camera 7 includes at least one lens assembly 14, but could possibly include other lenses like close-up, fish-eye and so forth mounted to a remotely-controlled turret 13 between lens assembly 14 and camera 7. At least one lens assembly would likely have remote-control zoom capability as well. Mounted atop the camera is housing 15, enclosing communications electronics and antenna as well as a position-indicating device. The latter may either comprise an active device such as a radio beacon or a device employing passive means like an RFID transponder.

The camera 7 is mounted to a camera head 16 with remote pan and tilt capabilities, similar to traffic cameras back on Earth. The camera 7 itself may have very high resolution, permitting mission personnel to pan, tilt and zoom electronically, with smaller sections of the video field still in good focus and contrast.

Telescoping pole element 17 is shown fully extended. Such extension may take in several ways, including but not exclusive to the following:
1) Compressed spring in area 20 is released, either automatically after the cover and parachute eject or remotely by command from mission control;
2) Valve opens on compressed air canister in section 20 to force telescoping pole sections into extension, either automatically or by remote command;
3) Compressed air canister in section 20 forces hydraulic fluid plunger upward, extending pole;
4) In FIG. 1A, as parachute 1 and tethers 2 slow the decent of the Buoy Cam module 4, the upward force thus exerted could pull the telescoping pole into full extension as it gradually descends;
5) Battery-operated pump forces hydraulic fluid into telescoping pole. Since it will also operate the camera pan/tilt head and Buoy Cam electronic systems, battery charge may be maintained by photovoltaic solar panels (PVs) 23 mounted around the top and possibly on the outer skin of buoy mount 24, covered by a transparent, weatherproof skin.

As options 1) to 4) essentially represent one-way (extend only) scenarios, spring-loaded lock pins 25 might be employed to keep the pole fully extended. This is shown enlarged where a pin 25a is pushed through a hole by spring 26 to lock it in place. Option 5) probably wouldn't employ such a locking pin, since this particular alternative could allow reversal of the pump to shorten or fully compress the pole if needed.

While the pole extension device may operate from an independent battery source, the rest of the pole-mounted buoy camera and its electronic systems will almost certainly run from batteries 37 charged by photovoltaic solar panels 36, as shown in FIG. 1D below.

The buoy shape assures that the telescoping pole camera lands in an upright position. Section 21 is weighted with sand, or some other material with similar properties, but it may also contain one or more storage batteries. At touchdown, the buoy structure lands rather forcefully around the center of bottom portion 22, made of shock absorbing material that gives and collapses on impact.

Section 20 may house spring, compressed air canister or other means for extending the pole, and it may also afford additional shock protection to the pole and camera elements above it. The telescoping pole elements 17 are housed in cylinder 19, as explained previously in the discussion of FIG. 1B.

Instead of or in addition to parachute element 1, three or more air bags may be evenly spaced around the lower sides of the weighted buoy structure. In the drawing, three air bags are mounted at points 31, 32 and 33, spaced at 120-degree intervals. These air bags 31a, 32a and 33a would immediately deploy upon impact, cushioning even a direct fall not slowed by parachute.

FIG. 10 is a block diagram of the electronic systems in a Buoy Cam 4, including at least one camera 7 capable of taking high-resolution still digital images as well as high quality video image streaming. Camera mechanism 34 operates from signals originating at mission control, and include electronically-operated pan and tilt. They may also include zoom, focus, iris control and lens selection from a rotating turret.

Locator device may comprise either passive transponder circuitry such as RFID or active radio beacon electronics, complete with appropriate antenna means. Locator device 28 is configured to determine a current location of the Buoy Cam 4. Local network communication device 29 serves as a radio node by which mesh and informal networks of surveying device Buoy Cam 4 elements can be established; as well as a common point for the locator electronics in such a network. Local network communication device 29 may also relay data and communication around the mission area and even serve as an ad hoc interface for communicating with robotic vehicles, proxy and other robots around the remote mission site.

Data and video transceiver 30 exchanges data, video and communication between elements within the surveying device Buoy Cam 4 and thereafter via appropriate antenna means 30a to a satellite or spacecraft 39 orbiting above the mission site which is then relayed through a separate relay transceiver (not shown) on satellite 39 to a base station, to mission control on Earth or to some other location. Specifically, transceiver 30 exchanges signals with local network communication device 29; receives data from locator device 28 and video from camera 7; and sends commands like "tilt up" to camera mechanism 34 which confirms with a data response.

Pole extend device 35 opens a gas canister or by other means causes the telescoping Buoy Cam pole 17 to extend and lock. This circuitry may either be powered from a common battery bank 37 or from an independent battery source 38. The latter might be preferable if the extend operation is considered one time only upon ground impact, since a small battery can store sufficient energy for that single operation. In any event, failsafe power could still originate with the common battery 37.

Photovoltaic solar panels (PVs) 36 on the top 23 of the buoy housing 8 and quite possibly on its sides 24 maintain battery bank 37 charged when sunlight is present, with sufficient charge capability in the PVs 36 and storage capacity in the battery bank 37 to keep Buoy Cam electronics operating through the night at a particular location. Obviously this implies considerable design difference between a planet with short days and nights and a place with month-long nights. As depicted, battery bank 37 powers all Buoy Cam electronic and electromechanical systems.

FIG. 2A illustrates a small network of four surveying devices Buoy Cams 41-44 spaced some distance apart over terrain 40 on a remote mission site like Mars. In the drawing, a target object 45 which may be a proxy robot, a robotic vehicle or the like, is being tracked by the radio beacon means or transponder means position indicating device described in FIG. 1C above. All four surveying Buoy Cams are ranging the target object 45, as indicated by ranging lines 41-45, 42-45, 43-45 and 44-45 between each Buoy Cam and the target. Dotted lines 41-42, 42-43, 43-44 and 44-41 represent at least one mesh network interconnection between each of the surveying Buoy Cam devices.

Figure 2B:
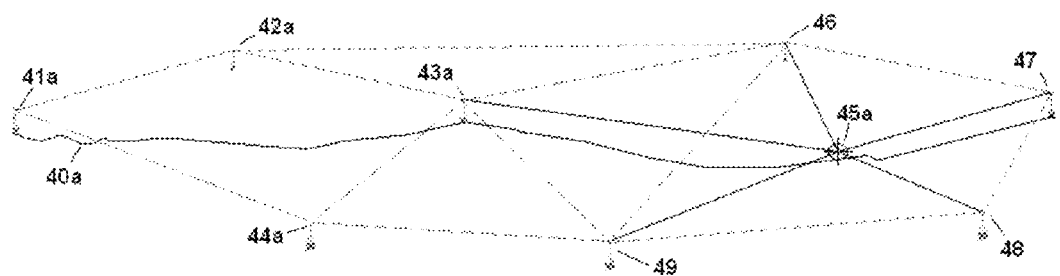
FIG. 2B is an illustration of an exemplary surveying device Buoy Cam network that has been extended over about twice the area depicted in FIG. 2A in accordance with embodiments of the invention.

In FIG. 2B the surveying device Buoy Cam network has been extended over about twice the area depicted in FIG. 2A, as shown by extended terrain line 40a (the scale of FIG. 2B is reduced to accommodate the greater area on the drawing page). Buoy Cam elements 41-44 on FIG. 2A are depicted in FIG. 2B as 41a-44a, and target object 45 in FIG. 2A (now labeled 45a) has moved into a new area surrounded by Buoy Cams 43a, 46, 47, 48 and 49.

FIG. 2B can represent two deployment alternatives. In the first, Buoy Cams 46-49 are already in place as part of a pre-mission staging activity; in the second alternative, a robot, robotic vehicle or, preferably, one or more proxy robots have ventured forth from the original staging area covered by FIG. 2A and placed Buoy Cams 46-49 in position. Scenarios for the first possibility will be discussed under FIG. 4 below, and discussed for the second alternative under FIG. 3 below.

In either case, it can be seen that the surveying device Buoy Cam mesh network has more than doubled in area from FIG. 2A to 2B, including not only connections 43a-46, 46-47, 47-48 and 48-49 but also new links 42a-46 and 44a-49 (and probably a number of others). So it can be seen that the use of multiple Buoy Cam nodes can rapidly increase the area of a mission under active reconnaissance, including precise positioning capability and—per the discussions to follow—equally precise visual capabilities.

Figure 3:
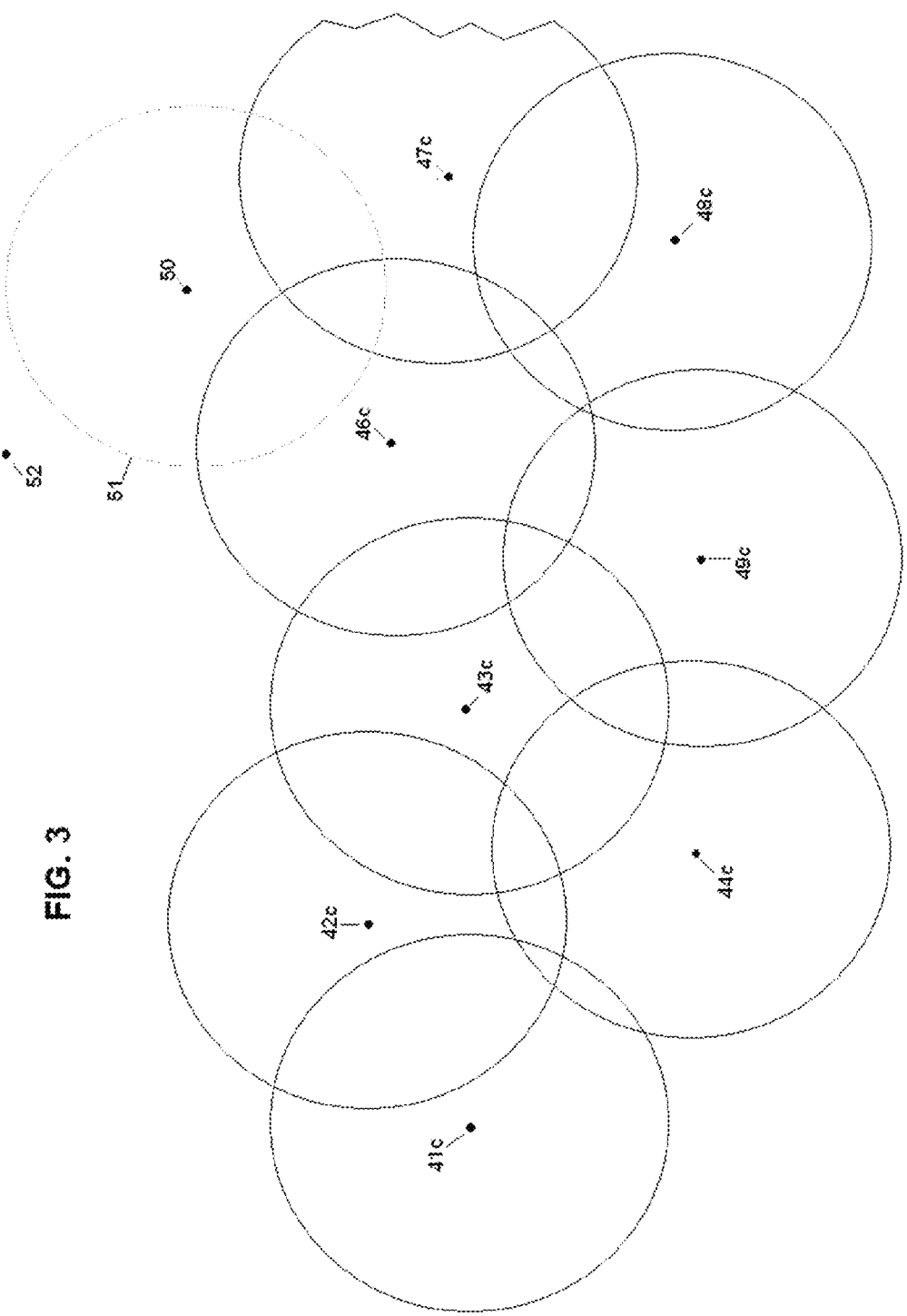
FIG. 3 is an illustration of an exemplary overhead view of the area shown in FIG. 2B in accordance with embodiments of the invention.

FIG. 3 is an overhead view of the area shown in FIG. 2B above, with points 41c, 42c, 43c, 44c, 46c, 47c, 48c and 49c positioned per each of the Buoy Cams in FIG. 2B. The circles around each of these points or nodes represent some particular ideal operational radius, for example 100 meters, for the camera portion of each Buoy Cam, since the radio positioning portion is apt to have a considerably larger radius than a typical high resolution video field. Note how the visual circles overlap, allowing areas relatively distant from a camera to be surveyed from two or more angles to maximize clarity.

The positioning of Buoy Cams including both visual and positional elements as depicted in FIGS. 2 and 3 can continue expanding indefinitely in this manner, in directions important to the mission. But it shouldn't be necessary to leave every Buoy Cam in place once an area has been thoroughly surveyed, especially in the presence of other "eyes on the ground" in proxy robots, robotic vehicles and pole cameras, as well as "eyes in the sky" in the form of observation satellites and balloons.

So, for example, it might be possible to leave Buoy Cams 41c, 43c and 48c in place, and remove the other five Buoy Cams for deployment in other areas of interest to the mission. Whether or not existing Buoy Cams need uprooting, FIG. 3 illustrates how a proxy robot and/or robotic vehicle can carry additional Buoy Cams for deployment at the edge of an active mission and thus extend the area of that mission, with gray circle 51 defining an area of operation around a new Buoy Cam node 50, and still another Buoy Cam position targeted at 52.

Figure 4A:
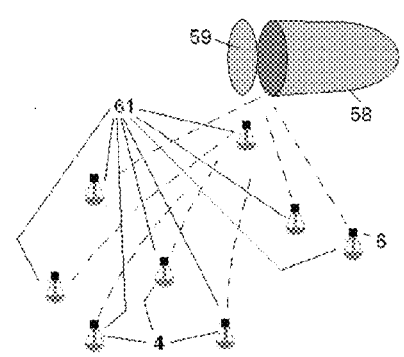
FIG. 4A is an illustration of an exemplary form of the pre-mission staging activity in accordance with embodiments of the invention.
Figure 4A:
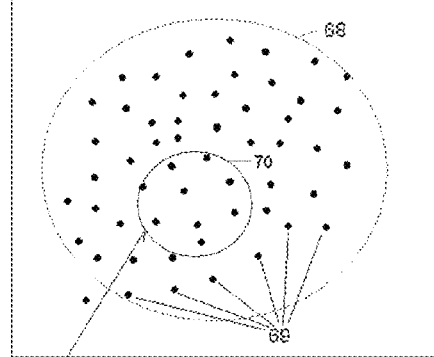
Figure 4A:
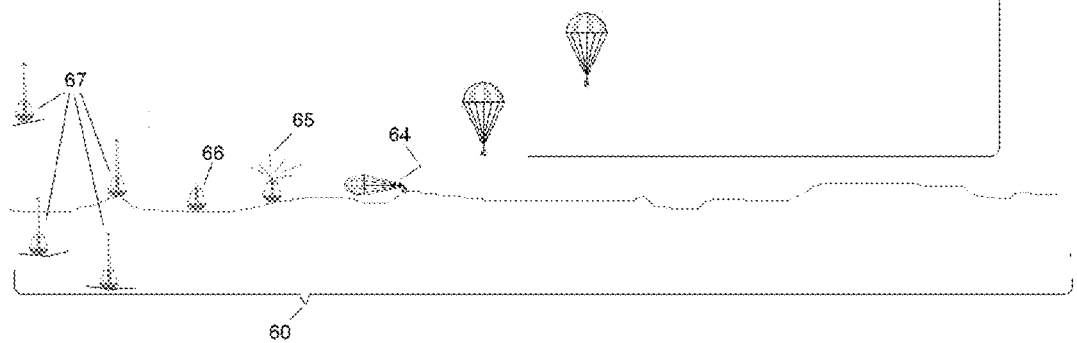

FIGS. 4A and 4B illustrate a form of the pre-mission staging activity mentioned in FIG. 2 above. In FIG. 4A, an orbiting vehicle 58 in relatively low orbit or sub-orbit over the mission area disperses, in "cluster bomb" fashion, the target area with a plurality of Buoy Cams. From a higher orbit or suborbit, the same orbiting vehicle 58 may also have deployed one or more communications satellites 39, or one or more satellites could also be deployed by previous missions or other means. In the illustration (not to scale), a hatch 59 in satellite 58 opens, and numerous Buoy Cam packages, including an outer cover 62 for the parachute means shown in 63, are systematically dropped over mission area 60. so as to fan out and form a distributed pattern on the ground like that shown in FIG. 4B.

The deployment of a Buoy Cam cluster like that shown in FIG. 4B requires a number of stages. Returning to FIG. 4A, Buoy Cam-parachute packages 61 must fall deep into the atmosphere of Mars or another planet before the parachutes 1 pop out of their housings 6 by small explosive charge or other means which senses when each Buoy Cam package is at some pre-determined height over the mission area ground.

In the parachute decent stage 63, Buoy Cam packages slow and land on their bottom side which can crumple a bit to absorb the force of landing and ensure upright deployment. When landing occurs 64, the outer cover, parachute ring and parachute itself are forcefully detached 65 (see description under FIG. 1B above), leaving an intact but still compressed pole camera array 66 in place.

At this point in the sequence, the telescoping pole is extended 67, and all Buoy Cam electronics are activated, including camera 7, position locator device 28 and communication means 29 (see FIG. 1D). The end result will be a cluster of active Buoy Cams like that depicted in FIG. 4B, where individual Buoy Cam devices 69 generally fill the target mission area 68.

In all likelihood, a number of Buoy Cams may malfunction in some manner due to breakage on landing, incomplete deployment (e.g., outer housing still attached), bad landing site (on the side of a steep crater wall, for example), or unknown causes, but ample distribution of the Buoy Cam cluster—with spacing between units of 100-200 meters for example—should go far in assuring good video, radio and positioning coverage until robotic help arrives to fix problems and move Buoy Cams as needed.

Moreover, even before such robotic help is available, some particular subsection 70 in the cluster of FIG. 4B may be found the most viable to provide accurate location data. This is shown as FIG. 4C. In such a case it may be possible to deploy proxy robots or robotic vehicles first to this area, allowing the robots to work outward in the task of shoring up the network of individual reconnaissance devices.

FIG. 5 is a flow diagram of a method of reconnaissance according to the present application. An orbiting space vehicle 58 identifies 502 a target area 68 and deploys 503 at least one communications satellite 39 over the target area 68. The orbiting vehicle 58 releases 504 a plurality of surveying devices Buoy Cam 4 over the target area 68 ejected by the orbiting vehicle 58. The release causes activation 506 of a plurality of sensors which may include a camera 7 and a locator device 28 on each of the plurality of surveying devices Buoy Cam 4 to collect data such as still images, video images and location data. In addition, the release 504 activates 508 a transceiver 30 on each of the plurality of surveying devices Buoy Cam 4. The surveying device Buoy Cam 4 transmits 509 the data from the sensors such as the still, video and location data to at least one communications satellite 39. The at least one communications satellite 39 relays 510 the data including to a base station enabling analysis of the data at the base station (not shown) at a remote location such as Earth or another orbiting platform, space station, etc.

In the present disclosure, numerous materials are listed as possible materials that can be used to manufacture the device and its components (e.g., support element). However, It should be noted that these materials are merely examples and that other materials may be used as well. It should also be noted that a set of support elements can include one support element or more than one support element.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

I claim:

1. A method of reconnaissance for the staging of a mission in a target area of a remote location in space utilizing a plurality of deployable camera/communications surveying devices (buoy cameras), wherein the buoy cameras include: a pole camera including at least one video camera; a camera mechanism comprising at least one lens and a pan-tilt head which can be operated remotely;
    a location device for determining local coordinates of the buoy camera and triangulating targets within its range; a local network communication device to serve as a radio node for video, communication and data interchange between the apparatus and other devices at the target area; a transceiver that exchanges video, communication and location data between the camera and an orbiting vehicle; and a power supply including at least one battery and at least one photovoltaic solar panel, the method comprising:
        identifying the target area from the orbiting vehicle;
        deploying at least one communication satellite over the target area;
        releasing the plurality of buoy cameras over the target area ejected by the orbiting vehicle;
        activating a plurality of sensors on each of the plurality of buoy cameras to collect video and data;
        activating the transceiver on each of the plurality of buoy cameras;
        transmitting the collected video and data to the at least one communication satellite;
        relaying, via a relay transceiver the collected video and data from the at least one communication satellite to a base station remote from the mission site to enable analysis of the data at the base station.

2. The method of claim 1, wherein the collected video includes still images and video images and the collected data includes location data via the location device.

3. The method of claim 1, wherein activating the buoy camera transceiver enables an exchange of data with at least one other buoy camera through a local network via the local network communication device.

4. The method of claim 3, wherein the local network is configured to create a mesh network interconnection between each of the plurality of buoy cameras.

5. The method of claim 1, further comprising receiving data and commands from the base station via the relay transceiver.

6. The method of claim 1, wherein the location data includes local mission coordinates from a surveillance grid at the mission site.

7. The method of claim 6, wherein the surveillance grid is established by a network of buoy camera transceivers.

8. A system of reconnaissance for the staging of a mission in a target area of a remote location in space utilizing a plurality of deployable camera/communications surveying devices (buoy cameras), wherein the buoy cameras include: a pole camera including at least one video camera configured to collect video and still pictures; a camera mechanism comprising at least one lens and a pan-tilt head which can be operated remotely;
    a location device for determining local coordinates of the buoy camera and triangulating targets within its range; a local network communication device to serve as a radio node for video, communication and data interchange between the apparatus and other devices at the target area; a transceiver that exchanges video, communication and location data between the camera and an orbiting vehicle; and a power supply including at least one battery and at least one photovoltaic solar panel, further including:
        a plurality of buoy cameras released from an orbiting vehicle;
        at least one sensor on each of the plurality of buoy cameras configured to collect data;
        wherein the at least one transceiver on each of the plurality of buoy cameras enables data to be transmitted between a communications satellite and the plurality of buoy cameras; and
        a relay transceiver on the communications satellite configured to relay the video and data from the plurality of buoy cameras to the base station.

9. The system of claim 8 wherein the location device collects highly accurate location data of a target object in the mission site area, the location data to be transmitted locally by the local network communication devices and to the base station via the relay transceiver.

10. The system of claim 9, wherein the local network communication devices relay data around the mission site and communicate with robotic vehicles, proxy robots and other robots in the mission area.

11. The system of claim 8, wherein the buoy camera comprises a buoy shaped device wherein a bottom of the buoy camera is weighted enabling the buoy camera to contact the target area bottom first upon landing.

12. The system of claim 8, wherein release of the plurality of buoy cameras causes a deployment of a parachute tethered to each of the plurality of buoy cameras allowing controlled descent of the of the plurality of buoy cameras.

13. The system of claim 11, wherein the bottom of the buoy camera includes a plurality of air bags that deploy upon impact to cushion the fall and protect the buoy camera.

14. The system of claim 8, wherein the plurality of buoy cameras further comprise a local communication network enabling the exchange of data between the plurality of buoy cameras.

15. A method of tracking the position of a target object in a mission area at a remote location in space utilizing a plurality of deployable camera/communications surveying devices (buoy cameras), wherein the buoy cameras include: a pole camera including at least one video camera; a camera mechanism comprising at least one lens and a pan-tilt head which can be operated remotely; a position-indicating location device for determining local coordinates of the buoy camera and triangulating targets within its range; a local network communication device to serve as a radio node for video, communication and data interchange between the apparatus and other devices at the target area; a transceiver that exchanges video, communication and location data between the camera and an orbiting vehicle; and a power supply including at least one battery and at least one photovoltaic solar panel, the method comprising:

deploying a plurality of the buoy cameras in the mission area;

activating the position-indicating location device on each buoy camera;

activating the local network communication device on each buoy camera;

linking the local network communication devices on the plurality of buoy cameras to form a mesh or informal network;

establishing a precise location of each buoy camera in a local grid at the mission area;

tracking the position of the target object on the local grid by ranging the target object's distance from the position-indicating location device on at least three buoy cameras.

16. The method of claim 15, wherein the target object is a robotic device and the local network communication devices serve as interfaces to communicate with robotic vehicles, proxy robots and other robotic devices around the remote mission area.

17. The method of claim 15, wherein the target object is tracked by radio beacon or other transmission devices on the buoy cameras and RFID or other transponder position-indicating devices on the target object.

18. The method of claim 15, wherein the local network communication device on each of the plurality of buoy cameras is adapted to form a local network to communicate with the target object and function as a local positioning system.

\* \* \* \* \*